United States Patent
Averianov et al.

(10) Patent No.: US 10,347,000 B2
(45) Date of Patent: Jul. 9, 2019

(54) ENTITY VISUALIZATION METHOD

(71) Applicant: OBSCHESTVO S OGRANICHENNOI OTVETSTVENNOSTYU "LABORATORIA 24", Tula (RU)

(72) Inventors: Vitalii Vitalievich Averianov, Tula (RU); Andrei Valerievich Komissarov, Tula (RU)

(73) Assignee: DEVAR ENTERTAINMENT LIMITED, Nicosia (CY)

( * ) Notice: Subject to any disclaimer, the term of this patent is extended or adjusted under 35 U.S.C. 154(b) by 0 days.

(21) Appl. No.: 15/569,174

(22) PCT Filed: May 25, 2016

(86) PCT No.: PCT/RU2016/000315
§ 371 (c)(1),
(2) Date: Oct. 25, 2017

(87) PCT Pub. No.: WO2016/190783
PCT Pub. Date: Dec. 1, 2016

(65) Prior Publication Data
US 2018/0150967 A1    May 31, 2018

(30) Foreign Application Priority Data

May 26, 2015    (RU) ................ 2015119725

(51) Int. Cl.
*G06K 9/00*     (2006.01)
*G06T 7/70*     (2017.01)
(Continued)

(52) U.S. Cl.
CPC ............. *G06T 7/70* (2017.01); *G06F 16/583* (2019.01); *G06K 9/00671* (2013.01); *G06T 7/00* (2013.01);
(Continued)

(58) Field of Classification Search
CPC ......... B60R 1/00; G06T 19/006; G06F 3/017; G06F 3/011; H04N 7/181
(Continued)

(56) References Cited

U.S. PATENT DOCUMENTS

| | | | |
|---|---|---|---|
| 9,412,180 B2* | 8/2016 | Ono | ........................ H04N 7/18 |
| 2005/0116964 A1 | 6/2005 | Kotake et al. | |

(Continued)

FOREIGN PATENT DOCUMENTS

RU    2463663 C2    10/2012

*Primary Examiner* — Charlotte M Baker
(74) *Attorney, Agent, or Firm* — Nadya Reingand; Yan Hankin

(57) ABSTRACT

The invention relates to the field of information technologies and computer technology, and specifically to the processing and generation of image data, and to the processing of images for computer graphics. An entity visualization method consists in capturing a digital image, receiving units of additional information from an electronic memory which stores a plurality of units of additional information, and displaying at least one unit of the plurality of additional information units, superimposing same onto the digital image; the electronic memory also stores data related to representations of corresponding entities; in each captured image frame, at least one entity is detected and recognized using the entity representation data received from electronic memory; computing the coordinates of the detected entity on the captured image, and displaying at least one unit of additional information in direct proximity to the corresponding entity on the captured image, which is output to a display.

8 Claims, 3 Drawing Sheets

(51) Int. Cl.
*G06T 7/00* (2017.01)
*G06T 11/60* (2006.01)
*H04N 5/232* (2006.01)
*G06F 16/583* (2019.01)
*G06F 3/14* (2006.01)

(52) U.S. Cl.
CPC ......... *G06T 11/60* (2013.01); *H04N 5/23293* (2013.01); *G06F 3/14* (2013.01)

(58) Field of Classification Search
USPC .......................................................... 382/103
See application file for complete search history.

(56) References Cited

U.S. PATENT DOCUMENTS

| | | |
|---|---|---|
| 2006/0195858 A1 | 8/2006 | Takahashi et al. |
| 2012/0001939 A1 | 1/2012 | Sandberg |
| 2014/0036129 A1 | 2/2014 | Nonaka et al. |
| 2014/0176606 A1 | 2/2014 | Narayan et al. |
| 2017/0106540 A1* | 4/2017 | Watanabe .............. B25J 9/1697 |

* cited by examiner

ENTITY VISUALIZATION METHOD

CROSS REFERENCE TO RELATED APPLICATIONS

The present patent application is a National stage application from PCT/RU2016/000315 filed May 25, 2016 which claims priority to Russian patent application RU2015119725 filed May 26, 2015, all of which incorporated herein by reference in their entirety.

FIELD OF THE INVENTION

The invention relates to IT, computer technology, namely, processing and generating image data, image processing for computer graphics, and can be used to search, retrieve and process and display image data.

BACKGROUND OF THE INVENTION

The closest in terms of technical essence is the image capture method, comprising the next steps: capturing a digital image; receiving position information of a capturing point of the image indicating position in which the digital image is captured; receiving information indicating capture direction of the image, indicating the direction in which the digital image is captured; a plurality of additional information items are received from the additional information storage device that stores a plurality of supplementary information items, wherein within the plurality of supplementary information elements, each element corresponds to a predetermined object, and each element contains object position information indicating the position of the corresponding objects; the view area is determined by the image capture position information and the image capture direction information is divided into subfields and selected for each of the subfields corresponding one or more additional information elements having an amount not exceeding an amount that is set in the corresponding one of the subfields among the plurality of additional information containing a plurality of information items of the objects respectively indicating the positions contained in the subfields; and displaying the corresponding one or more elements from the plurality of additional information elements overlaid on the digital image, wherein the corresponding one or more elements from the plurality of supplementary information items are selected in the selection step (see RU 2463663 C2, G06T19/00, G06T11/60).

A known method can be implemented to visualize and filter additional landmark information superimposed on a terrain image captured by a video camera.

The disadvantage of the known method is its limited application only in the mapping of the landmarks of the terrain and that it requires obtaining data on the direction and position of the capture. The known method can not be used to display additional information about movable objects or objects that are not tied to the terrain. In addition, the need to obtain data about the position and direction of image capture implies the existence of appropriate coordinate systems, for example, GPS and compass, which are not accurate enough (especially in conditions of elevation difference or urban conditions).

These drawbacks limit the scope of application of the known method.

SUMMARY

The technical result is widening area of application of the method by providing the ability to identify the object on the captured image on the basis of the image data of the object itself, as well as to improve the accuracy of the localization of the visualized object.

The abovementioned result is achieved by the object visualization method comprising capturing a digital image, obtaining additional information elements from electronic memory, that stores a plurality of additional information elements, each of which corresponds to a predetermined object, mapping at least one of the plurality of additional information elements superimposed on a digital image, further storing in electronic memory image data of the respective objects in addition to said additional information about the object, detecting and recognizing at least one object in each selected frame of the captured image using the image data of the object obtained from the electronic memory, calculating coordinates of the detected object on the captured image, displaying at least one additional information element in close proximity to the corresponding object on the captured image. If the detected and recognized previously on selected frames object has ceased to be detected on subsequent selected frames for a predetermined time, it is concluded that there is no object in the captured image, and thus output of additional information related to the object is stopped, image capture is performed by the digital camera of the visualization device and is outputted to the screen.

Furthermore:
the object is recognized on the basis of the image data of its shape and/or color and/or texture;
the selected frame of the captured image on which the object is detected and recognized is each n-th frame of the video image, where n is a natural number 1, 2, 3, 4 . . . , or each frame formed by the time the computing means are ready to detect and recognize the object on said frame;
image data of an object includes at least general features and special features, wherein object detection and recognition is performed in the following sequence using common object image features: detecting the object on the selected frame, calculating the coordinates of the detected object on the selected frame using special features of object images, perform object recognition in the selected frame of the captured image;
calculating the expected coordinates of the object in the next frame based on the object's coordinates in the previous frames and limit the area of recognition of the object on the next frame by the set of the expected object coordinates. Meanwhile if the non-recognition time of the object in the specified restricted recognition area in the subsequent selected frames exceeds the pre-set threshold value, then detection is performed again on the entire selected frame.
displaying the captured image mark out on the screen the area where the detected and recognized object is located;
marking out of the recognized object is carried out by highlighting a part of the image containing the image of the object;
image capture is performed by a camera of a visualization device comprising a screen for outputting the captured image;
object image data is created and recorded into electronic memory is carried out in advance.

BRIEF DESCRIPTION OF THE DRAWINGS

The object visualization method is explained with the help of the drawings, where.

Figure 1:
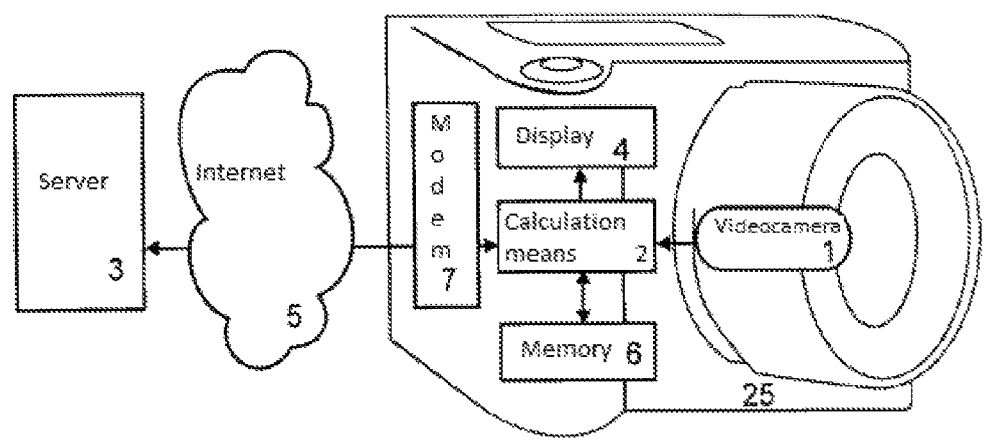
FIG. 1 shows a block diagram of the device for realizing an object visualization method based on a digital camera.

The following keys are made in the drawings:

1—video camera, 2—computing means, 3—server, 4—digital display (screen), 5—Internet, 6—electronic memory: 7—server communication device, 8—image of the actual object, 9—visualized image of the object, 10—additional information, 11—mobile visualization device, 12—image capture and display on the displaying device, 13—access to electronic memory and retrieval of image data of the object, 14—digital image analysis to detect the object, 15—calculation of the object coordinates on the captured image, 16—comparing the duration of the absence of detection of objects on selected frames with a threshold value of time $T_{min}$, 17—object recognition, 18—object selection, 19—accessing electronic memory and extracting additional information, 20—formation of a signal for superimposing additional information on the captured image for displaying, 21—displaying additional information on the screen, 22—analyzing the presence of the digital image signal, 23—ending the program if the digital image is absent, 24—transition to the next selected frame, 25—digital camera (video camera), 26—object image data retrieval, 27—object detection means in the video image frame, 28—coordinates calculation means in the frame, 29—means for calculating the expected coordinates of the object in the next frame, 30—means for extracting additional information from the electronic memory, 31—means for generating the signal for superimposing additional information and highlighting the object, 32—digital image from camera output, 33—image data of objects and additional information stored in electronic memory, 34—object visualization signal for displaying.

DETAILED DESCRIPTION OF THE PREFERRED EMBODIMENT

The essence of the object visualization method is creating images of the objects and multiple additional information elements associated with the objects, each of said elements corresponding to a predetermined object and storing them in the electronic memory before hand.

An image is captured with a digital camera imaging device and outputted to the screen, and then detection and identification of at least one object in each selected frame of the captured image is carried out based on the image data such as its shape and/or color and/or texture using object image information obtained from the electronic memory, the coordinates of the detected object in the captured image are calculated, at least one item of additional information in immediate vicinity to the corresponding object to be displayed on the captured image superimposed on a digital image is obtained from electronic memory and displayed. In this case, if the object detected and recognized on the previous selected frames is no longer detected on subsequent selected frames for a predetermined period of time, it is concluded that there is no object on the captured image and stops output of additional information associated with the object.

In this case, each selected frame of the captured image, where the object is detected and recognized, is each n-th frame of the video image, where n is a natural number 1, 2, 3, 4 . . . , or each frame formed by the time the computing means are ready to the detection and recognition of the object.

The image data of the objects contain, at least, common characteristics that are typical for all detected objects and special features that are typical only for a specific object. Using common features of object images, the object is detected on the selected frame, in its entire area, the coordinates of the detected object are determined on the selected frame, and then the object is recognized in the selected frame of the captured image using special features of the object images.

When recognizing an object already detected on previously selected frames, the recognition is performed on a limited area of the frame, the coordinates of which are predicted based on the object coordinates computed on the previous selected frames. In this case, if the non-detection time of the object in the limited area of the subsequent selected frames exceeds a predetermined threshold value, further detection is performed again on the entire area of the selected frame.

The area of the detected and recognized object on the screen is shown when the captured image is displayed by highlighting part of the image containing the image of the object.

The image capturing is performed by a digital camera of a visualization device comprising a screen for outputting the captured image, computing means and electronic memory.

The object visualization method is implemented as follows.

The composition of the objects to be visualized is determined and their images are created in advance for use in the process of detection and recognition of images of said objects. Images of the objects include multiple image features of such object that are typical for the corresponding object, used in the process of detection and recognition of the image of the object on the captured image. In this case, the images of the objects represent at least two groups of features, one of which is common, typical for all pre-installed objects. The features of this group are used to determine the existence of any object in the image, that is, the detection of the object. The features of the other group are used to recognize a particular object in the image.

Furthermore, an array of additional information related to certain previously identified objects is being created in the form of additional information elements associated with one of the specified objects, such as text, image or multimedia. The image data of objects and additional information about these objects along with data on the links of the additional information elements with the specific objects is stored in the electronic memory connected with the visualization device.

After the camera of visualizer is turned on, the image is captured by it and displayed on the screen of the visualizer. The captured digital image is sent as input signals to the computing means.

Computing means access electronic memory in the process of detecting and recognizing predefined specified objects on the captured image using previously created images of objects. The object recognition is performed on each selected video frame, based on image data comprising its shape and/or color and/or texture. Each selected frame is every n-th frame of the video image, where n is a natural number 1, 2, 3, 4 . . . . However, if the performance of the computational means is insufficient for processing each n-th frame, then the selected frame is each frame of the video image formed by the time when the computing means finish the previous processing cycle and will be ready to process a new frame for the object detection and recognition.

Detection and recognition of objects is carried out in several steps, first using common features of images, typical for all objects, object detection is performed on the selected frame, within the whole frame. The fact of detection indicates the presence of one of the objects, without specifying which particular object was detected. Next, the coordinates of the detected object are calculated on the selected frame, and then, using special features of the object images, the specific object is recognized in the selected frame of the captured image, taking into the account coordinates of the detected object.

In order to save the resources of the visualizer, and to increase the speed of visualization of the object, recognition of the object already detected on the previous selected frame is not carried out over the entire area of the selected frame, but only on its limited area. The coordinates of this area are predicted based on the values of the calculated object coordinates on the previous selected frames. However, if the time during which the detection of an object on the specified limited area in the subsequent selected frames ceases to exceed a predetermined threshold value, for example, 100 frames of the captured video, then further detection is performed on the entire area of the selected frame.

If there is a fact of recognition of one of the objects, then turning to an array of additional information stored in the electronic memory and retrieving elements of additional information associated or connected with the recognized object.

Next, a digital image signal of the additional information is generated and displayed, including at least one element from the plurality of additional information elements defined in advance as associated with the detected object. Said additional information elements are overlayed over the digital video image from the video camera of the visualizer. The detected object on the displayed image is marked by highlighting the object location area.

The output of the additional information on the screen is carried out so that additional information is placed over the output image in the area of the image of the corresponding detected and recognized object.

If on a subsequent frame of the captured image it is not possible to detect an object having associated additional information already being rendered, then displaying additional information on the screen continues for a predefined time, after which, if the object image is detected again, it is concluded that the object is present and output of the additional information is continued. If an object is not found within the stipulated time, it is determined that the object is absent on the captured image and displaying additional information on the screen is terminated.

Recognition of an object on a video image provides the ability to identify a specific object by its external features, which in turn provides the ability to implement the method without any reference to the terrain or map and also identify moving objects or objects being moved.

By detecting and recognizing the object directly on the video image and tracking the coordinates of the moving object in the frame, high accuracy of the object localization in the image is provided, and it does not depend on the limitations of any navigation systems.

Figure 3:
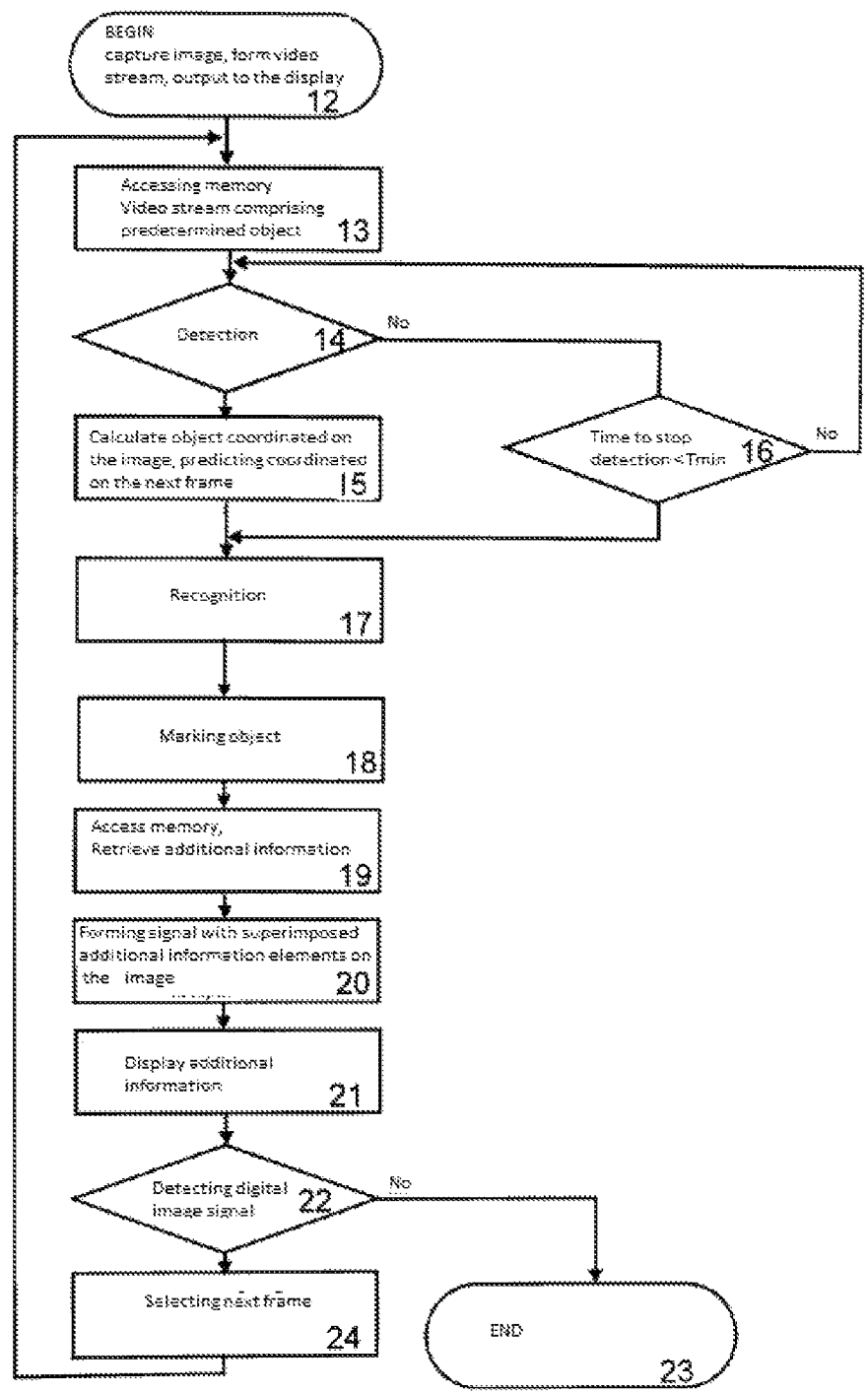
FIG. 3 shows a structural diagram of the computing means of the visualization device operation.

The computing means of the visualizer are made on the basis of a processor, operating under control of the corresponding operating system. The scheme of operation of computing means when implementing object visualization method includes the following main steps (FIG. 3).

The beginning of execution involves turning on a video camera and the forming a digital image, which is displayed in real time on the screen of the visualizer. The generated digital image is fed to the input of the computing means, which begin to access the electronic memory as soon as the signal appears. Wherein reference images of the objects stored in the electronic memory. Said reference images are being used for objects detection and recognition. Object detection is repeated on each selected video frame.

Once the object is detected on the image captured by a video camera, the calculation of its coordinates is performed. The detected coordinates being used for operation of the object coordinates predicting means, providing calculation of the expected coordinates in the further frame.

In case the detected object is recognized within the computed frame coordinates, the detected object image is equated with the real object that is in the field of view of the video camera.

Recognition in subsequent selected frames is performed on a limited area of the frame, the coordinates of which are computed by the means of predicting the coordinates of the object. If during a pre-set time $T_{min}$, it is not possible to detect an object in this limited area of the frame, the detection is performed again over the entire area of the selected frame. This way, the movement of the detected object within the frame is monitored simultaneously.

The computing means appeal to the electronic memory to extract additional information associated with the detected and recognized object.

The calculated object coordinates are also used to associate additional information images and to select the image area of the object on the captured image.

The output signal and the superimposing of additional information on the captured image are generated and additional information is displayed on the screen, taking into account the object coordinates on the output image.

If, as a result of analyzing the digital image on the currently selected frame, the image of the object can not be detected, the image analysis process is continued with processing of the next selected image frame. The image analysis is continued while the corresponding program is launched.

Also, analysis of presence of a digital image at the input of computing means is performed. If the digital image signal comes to the input of the computing means, the process is repeated for each selected frame, tracking movement of the object image on the captured image and performing corresponding adjustment of the visualized additional information.

If the digital image signal ceases to exist the process of object visualization terminates, which means, for example, disconnecting the video camera. The command to terminate the program is generated.

Figure 4:
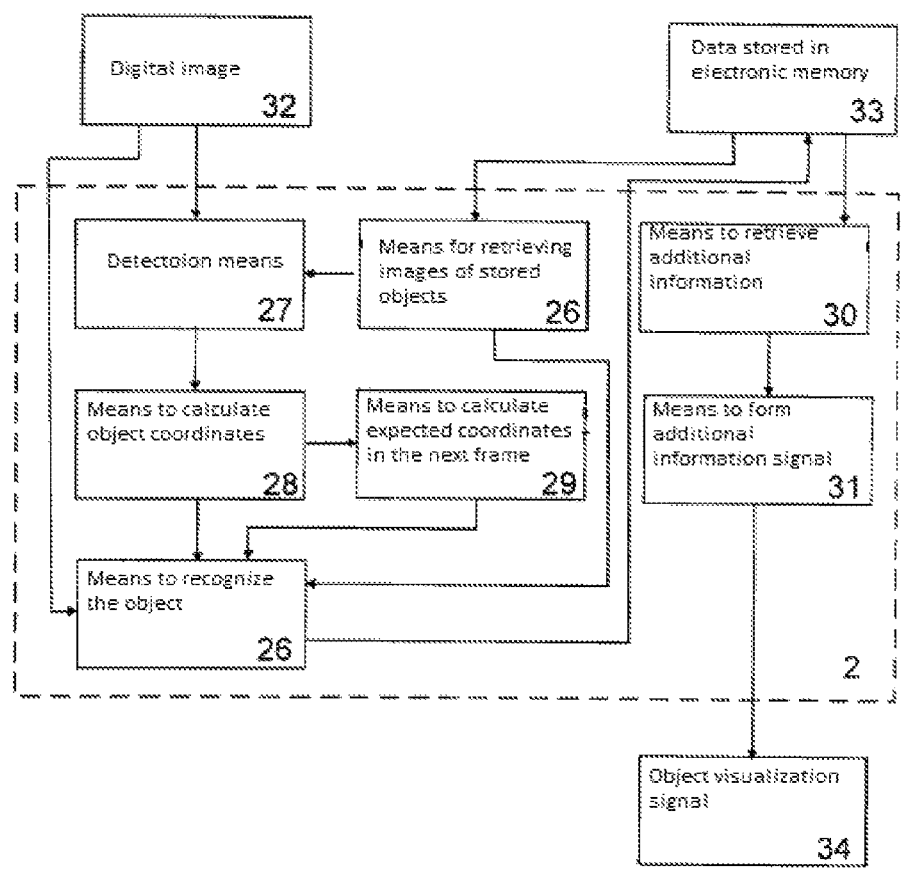
FIG. 4 is a functional diagram of computing means.

Functional diagram of the computing means (FIG. 4) shows the interrelations among the elements of the plurality of means implementing the method. The digital video image is fed to the object detection means, which also receives image data of the objects from the output of the object image extraction means. The detection results are fed to the coordinate calculating means, the calculation results of which are analyzed in the means of calculating the expected coordinates of the object on the next frame. The current and expected coordinates are fed to the inputs of the recognition means, video image and image data are fed thereto. Based upon the results of recognition, the additional information extraction means retrieve additional information associated with the object and direct it to the means forming signal that includes additional information to superimpose it on the captured video image.

EXAMPLE 1

Figure 2:
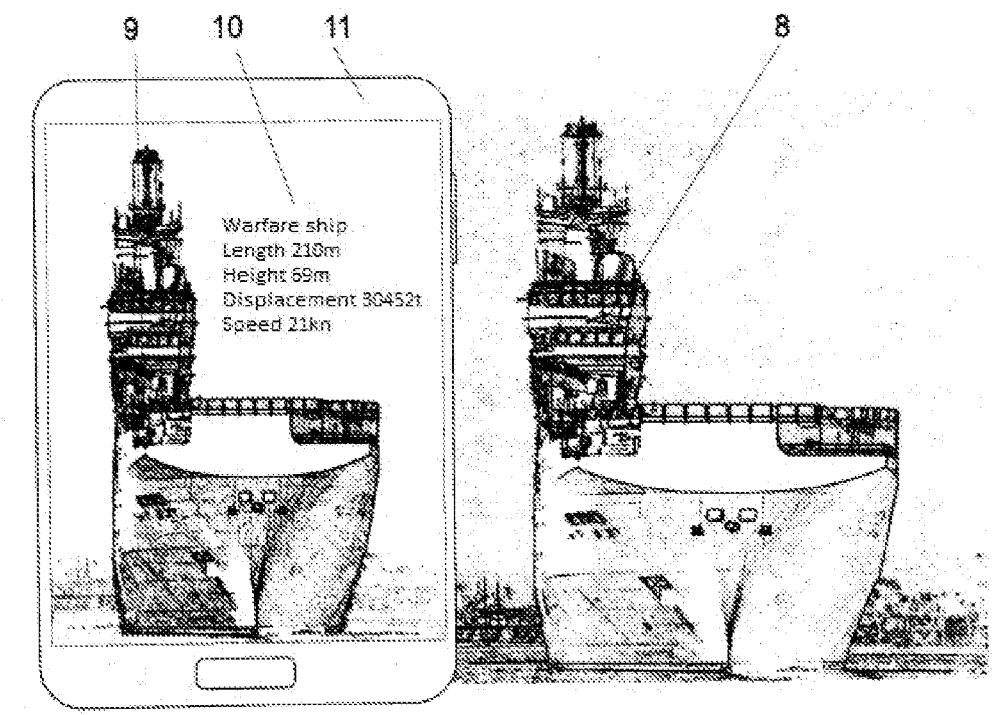
FIG. 2 shows a real image on which there is an object and image of the rendered object on the mobile display device.

The visualizer is a mobile device (FIG. 2) containing a front-facing video camera, processor-based computing means, electronic memory for storing object images and additional information, and a screen.

The previously created image data of the objects and additional information associated with these objects is entered to the embedded or removable memory of the mobile visualizer.

To visualize an object, the camera is guided to an object to be displayed and the image is captured using a video camera. In this case, the viewing angle of the video camera lens and the distance to the object are chosen so that the captured image shows a large part of the object or the object is represented entirely. The captured image is displayed on the screen of the mobile display device.

The digital image signals are also directed to the input of the computing means which, when there are input signals of the captured image, address the electronic memory, retrieving image data of the objects for detecting and recognizing the object on the captured image. Features of the image such as the object as a contour formed by the boundaries of color and brightness differences, color and color correlations, the presence of regular elements characterizing the texture, etc are used for recognition.

Object features common to all objects are used in the process of detection. The result of the identification can be either detecting presence of the object in the selected frame, or detecting absence of the object.

In the first case, the coordinates of the object in the frame are calculated and, using the special features of the object images, the detected object is recognized.

The coordinates of the detected object in several previous selected frames are used to predict the coordinates of the object in the subsequent frame, forming the set of expected object coordinates, which allows to lower the performance requirements of the visualizer. In this case recognition is carried out on the next frame within a limited area or area of the frame. After the object is detected and identified in the captured image, the computing means turn to the electronic memory to retrieve additional information associated with the detected and identified object, which is displayed by overlaying the displayed captured image. Additional information is a text containing letters and/or numbers that have an explanatory or descriptive character relating to the detected object, as well as images and multimedia information.

Displaying additional information is visualized at a translucent transparency and outputted in the immediate vicinity of the image of the detected and identified object. The image area of the object itself is highlighted in such a way, so that the image of the object becomes brighter compared to the background image.

If during the output of additional information, detection and identification ceased and has not resumed within 1 second, then the withdrawal of additional information is discontinued.

EXAMPLE 2

The visualizer is a digital camera (FIG. 1) equipped with a lens with a digital image generation matrix forming a video camera with digital display, computing means, electronic memory and a server intercoupler, which is a modem, for connecting to the computing means via a radio channel using the Internet. The server provides storage of image data of objects and additional information.

Images of objects for their detection and recognition, as well as additional information are created in advance and stored at the server, with the ability to connect to it via the Internet and retrieve the information stored therein.

During the shooting process, the camera lens is projected onto the scene and image capture is performed, while the video image formed by the matrix is displayed on the camera screen.

The captured digital image is also transmitted to the input of the computing means that are connected by means of a modem via the Internet to the server. The captured image is compressed by the computing means and transferred to the server where image processing is performed to detect the features of the objects on the image using images previously created and stored in the memory of the server.

If the object is detected in the image and recognized then additional information associated with the detected object the corresponding image are extracted from the electronic memory and transmitted via the Internet to the modem input and then to the electronic memory of the camera.

With the help of the computing means of the camera, the image of the object is recognized on the captured image, additional information is associated with the object from the camera's electronic memory, and additional information on the captured image is displayed on the camera's screen. In this case, the image is visualized so that the detected and recognized object is displayed in a square or oval frame formed by brighter lines, and additional information is superimposed on the image in the immediate vicinity of the image of the object.

EXAMPLE 3

The visualizer is glasses with an embedded video camera, computer means with electronic memory and a screen.

Pre-created images of objects and an array of additional information are stored n the electronic memory of the visualizer.

On the visualizer screen an image captured by a front-facing video camera embedded to the glasses frame is displayed. The captured digital image is also transmitted for processing to computing means that, referring to electronic memory, receive object images and provide detection and recognition of the objects on the captured image. After the object is recognized, an area around the object on the screen is selected with a rectangular frame formed by bright lines that overlap the output captured image and additional information is extracted from the electronic memory and superimposed over the captured image output in the immediate vicinity of the detected object.

The computer means provide the calculation of the coordinates of the detected object on the captured video image. They are used for selecting the visualization coordinates of the object selection frame and additional information, so that the position of the frame and placement of additional information accompany the image of the object as it moves while the object is detected in the image.

If during the output of additional information the detection and recognition of the object detected earlier ceased and within 30 selected frames of the captured video image is not resumed, the output of additional information and the object selection frame are stopped.

The visualizer can be implemented using standard electronic components: LED displays, processors, solid-state memory elements, modems, etc.

Thus, the visualizer has a wider scope of application due to the ability to identify the object on the captured image based on the image data of the object itself, as well as to improve the localization accuracy of the object being visualized.

What is claimed is:

1. A method for visualizing of an object at a visualizer device, comprising a camera, an electronic memory and a screen, said method comprising:
    capturing a digital image of the object by the camera, forming a captured digital image,
    acquiring additional information elements from the electronic memory, said electronic memory adapted to stores image data of a plurality of predetermined objects and a plurality of additional information elements, wherein each said additional information element corresponds to one of said plurality of predetermined objects,
    displaying on the screen at least one of the plurality of additional information elements while superimposing them on the digital image,
    detecting at least one detected object in each selected frame of the captured digital image,
    recognizing the detected object by identifying a corresponding predetermined object from the plurality of predetermined objects;
    using image data of the corresponding predetermined object obtained from the electronic memory,
    calculating coordinates of the detected object on the captured digital image,
    retrieving from the electronic memory and displaying at least one additional information element of the corresponding predetermined object in an immediate vicinity of a recognized object on the displayed captured digital image,
    if the object detected and recognized on previously selected frames is no longer being detected on subsequently selected frames for a predetermined time, concluding that there is no object on the captured digital image and stopping output of the at least one additional information element associated with the recognized object.

2. The method according to claim 1, characterized in that the step of object recognizing is performed on basis of its shape and/or its color and/or its texture.

3. The method according to claim 1, characterized in that the selected frame of the captured digital image on which the object is detected and recognized comprising each n-th frame of a video image, wherein n is a natural number of 1, 2, 3, 4 . . ., or each frame formed by the time the computing means are ready to detect and recognize an object on it.

4. The method according to claim 1, characterized in that image data of the object includes at least common features and special features, while the detection and recognition of objects performed in the following sequence: detecting the object on the selected frame using the common features, calculating the coordinates of the detected object on the selected frame using the special features, performing recognition of the object in the selected frame of the captured digital image.

5. The method according to claim 1, characterized in that expected coordinates of the object in a next frame are calculated based on the object's coordinates in a previous frames, and limiting an area of recognition of the object on the next frame by a set of expected object coordinates, wherein if recognition time in] the subsequently selected frames will exceed a pre-set threshold value, then further detection is performed on an entire selected frame.

6. The method according to claim 1, characterized in that an area of the detected and recognized object is marked on the screen when the captured digital image is displayed.

7. The method according to claim 1, characterized in that the recognized object is marked by highlighting a portion of the captured digital image containing the object.

8. The method according to claim 1, characterized in that the captured digital image forming and storing in the electronic memory is performed in advance.

* * * * *